April 16, 1940.   M. L. FORREST   2,197,211
DRIVE SPROCKET FOR CHAIN SAWS
Filed April 1, 1938
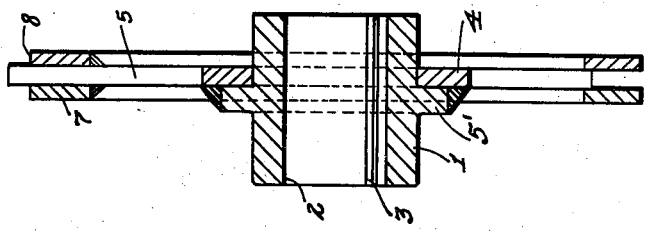
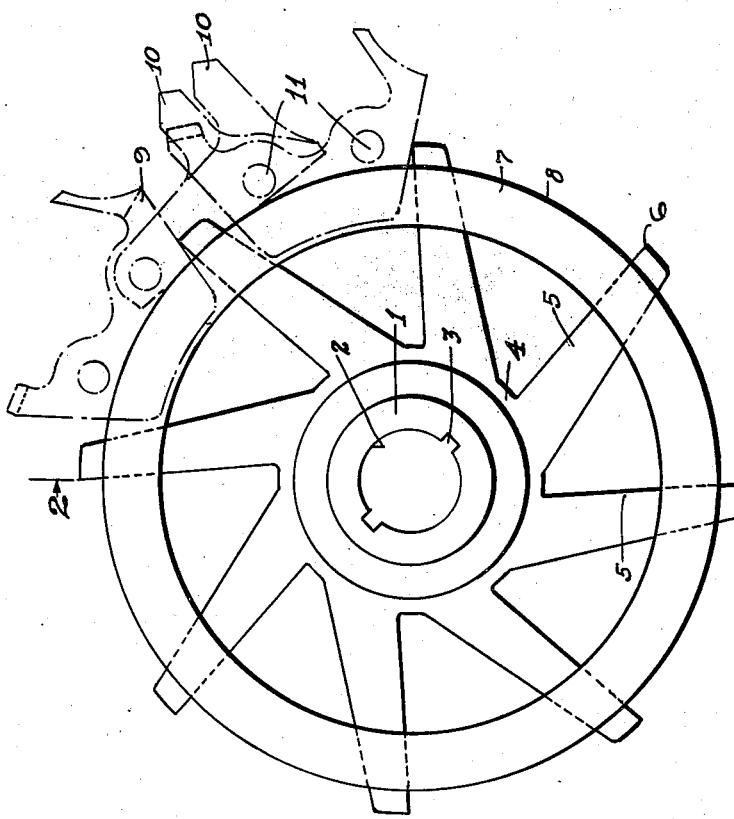
Inventor:
Mark L. Forrest
By Charles A. Warren
attorney Patented Apr. 16, 1940

2,197,211

UNITED STATES PATENT OFFICE 2,197,211

DRIVE SPROCKET FOR CHAIN SAWS

Mark L. Forrest, Portland, Oreg.

Application April 1, 1938, Serial No. 199,479

2 Claims. (Cl. 74—243)

The present invention relates to a sprocket for use in connection with chain saws, and the principal object of the present invention is to provide an extremely light driving sprocket which is sufficiently strong to assure against failure in service, and which will provide for driving the chain most efficiently.

The usual chain saw is made up of a plurality of pivotally connected links, some of which have cutting teeth and some of which have drag teeth. The tension on the saw chain is in the line of the centers of the pivotal connections between the teeth, and if the chain is driven by engagement between the driving member and the chain at a point inward of the arc defined by the pivotal connections, the chain will not remain positively in the desired position, and there will be a substantial power loss through objectionable excessive tightening and buckling of the chain. One of the features of the present invention is to provide for driving the chain by means of a sprocket, which engages with the chain at points which include the arc defined by the axes of the pivotal connections as they move around the driving sprocket.

Other and further objects and advantages of the invention will more fully appear from the following detailed description taken in connection with the accompanying drawing, in which—

Fig. 1 is a side elevation of a sprocket embodying the invention.

Fig. 2 is a sectional view along the line 2—2 of Fig. 1.

Like reference characters refer to like parts in the different figures.

With reference first to Fig. 1, the sprocket embodying the invention comprises a hub 1, having a bore 2 to fit onto the shaft of a source of power, not shown. Suitable key ways 3 are provided in the bore. A spider 4 is welded, or otherwise secured, to a radial flange 5' on the hub, the spider having a plurality of uniformly spaced spokes or teeth 5, the forward edge 6 of each leg extending substantially radially of the spider. In the particular arrangement shown, the forward edge 6 is slightly backed away from a precise radial position in order that, as will hereinafter appear, the spoke will engage the link only at the outer end of the spoke, as shown in the drawing.

A ring 7 is welded, or otherwise secured to the opposite sides of the teeth 5, so that the outer surface 8 of each ring defines a cylindrical surface concentric to the axis of the hub and spaced inwardly a slight distance from the outer ends of the spokes. As best shown in Fig. 2, the spokes are relatively thin to fit between pairs of links of a chain saw, as hereinafter described, and the rings 7 are also relatively thin so that the total thickness of the rings and spokes is approximately that of the chain saw driven by the sprocket. Moreover, the rings 7 are as narrow as possible without detrimentally affecting the required strength thereof, in order to reduce the weight of the sprocket. It will be understood that saw machines to which a driving sprocket of this type are applicable are intended to be portable, and it is accordingly essential that each element of the machine be extremely light in order to maintain the total weight of the machine at a minimum.

Although a sprocket of this character may function in connection with various types of flexible chain saws, the sprocket is especially applicable to driving a non-reversible chain saw of the type shown in the Forrest copending application, Serial No. 199,478, filed April 1, 1938, in which is described and claimed the specific saw construction.

The chain saw to which this sprocket is particularly applicable comprises inner drag links 9 pivotally connected to pairs of cutting links 10, each having a cutting tooth extending outwardly therefrom. Each link has spaced openings to receive pivot pins 11 by which the links are connected together, and the drag links are of a thickness substantially that of the spokes in order that the inner portion of the drag links may fit between the rings 7 and between adjacent spokes. The opposite side edges of the drag links are so proportioned as to extend approximately radially of the sprocket when the chain is wrapped therearound, being arranged to assure an engagement between the end of each spoke or tooth and the edge of the drag link. Moreover, adjacent drag links are spaced apart to allow for sufficient room for the spokes to enter therebetween, as shown.

Each of the cutting links has a centrally positioned arcuate inner surface which rests upon the outer peripheries 8 of the rings 7 and accordingly prevents the drag tooth from wedging in between adjacent spokes on the sprocket. The spacing of the arcuate surfaces from the pivot points of the cutting links and the spacing of the peripheries 8 from the ends of the spokes is proportioned so that the ends of the spokes engage the drag links along an arcuate line which intersects the axes of the pivot pins, since it is along this line that the driving action of the sprocket can take place most advantageously.

I claim,

1. The combination with a chain saw comprising inner and outer links pivotally connected, of a sprocket for said saw comprising a hub, spokes extending from said hub, said spokes at their outer ends being relatively narrow to extend between successive inner links of the saw, and means on said spokes positioned inwardly of the ends thereof to define a cylindrical surface concentric to the hub axis for engagement with the outer links of the chain, the leading edge of each spoke at its outer end extending substantially radially of the sprocket and each spoke extending beyond the means on the spokes to provide for engagement between the links and the spokes along a line including the centers of the pivotal connections of the links, the edges of the inner links engageable by said sprocket also extending substantially radially of the sprocket when the chain is wrapped therearound.

2. The combination with a chain saw comprising inner and outer links pivotally connected, of a sprocket for said saw comprising a hub, spokes extending from said hub, said spokes at their outer ends being relatively narrow to extend between successive inner links of the saw, and means on said spokes positioned inwardly of the ends thereof to define a cylindrical surface concentric to the hub axis for engagement with the outer links of the chain, the edges of the inner links engageable by said sprocket spokes extending substantially radially of the sprocket when the chain is wrapped therearound, and the leading edge of each spoke at its outer end being slightly backed away from a radial position, whereby the links engage the spokes only at the outer ends of said spokes, each spoke extending beyond the means on the spokes to provide for engagement between the links and the spokes along a line including the centers of the pivotal connections of the links.

MARK L. FORREST.